(12) United States Patent
Gupta et al.

(10) Patent No.: US 11,860,021 B2
(45) Date of Patent: Jan. 2, 2024

(54) SENSING OF A WATER LEVEL IN REFRIGERATED CABINETS

(71) Applicant: Carrier Corporation, Palm Beach Gardens, FL (US)

(72) Inventors: Ankit Anand Gupta, Uttar Pradesh (IN); Stella M. Oggianu, Farmington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 5 days.

(21) Appl. No.: 17/059,032

(22) PCT Filed: Nov. 19, 2019

(86) PCT No.: PCT/US2019/062181
§ 371 (c)(1),
(2) Date: Nov. 25, 2020

(87) PCT Pub. No.: WO2020/106699
PCT Pub. Date: May 28, 2020

(65) Prior Publication Data
US 2021/0270659 A1    Sep. 2, 2021

(30) Foreign Application Priority Data
Nov. 20, 2018    (IN)    .............. 201811043594

(51) Int. Cl.
*G01F 23/22*    (2006.01)
*A47F 3/04*    (2006.01)
(Continued)

(52) U.S. Cl.
CPC .............. *G01F 23/22* (2013.01); *A47F 3/04* (2013.01); *G01F 23/24* (2013.01); *G01F 23/296* (2013.01)

(58) Field of Classification Search
CPC ...... G01F 23/24; G01F 23/241; G01F 23/242; G01F 23/243; G01F 23/244; G01F 23/26;
(Continued)

(56) References Cited

U.S. PATENT DOCUMENTS

| 4,901,245 A | 2/1990 | Olson et al. |
| 6,730,865 B1 | 5/2004 | Hernandez-Zelaya |

(Continued)

FOREIGN PATENT DOCUMENTS

| CN | 104720443 A | * | 6/2015 |
| CN | 205506161 U | | 8/2016 |

(Continued)

OTHER PUBLICATIONS

International Preliminary Report on Patentability; International Application No. PCT/US2019/062181; International Filing Date: Nov. 19, 2019; dated Jun. 3, 2021; 8 pages.

(Continued)

*Primary Examiner* — Herbert K Roberts
(74) *Attorney, Agent, or Firm* — CANTOR COLBURN LLP

(57) ABSTRACT

A system for monitoring a water collecting container includes a first sensor operable to detect if water is present within the water collecting container, a second sensor operable to determine a level of water within the water collecting container, and a processing device operably coupled to the first sensor and the second sensor.

14 Claims, 6 Drawing Sheets

(51) Int. Cl.
*G01F 23/24* (2006.01)
*G01F 23/296* (2022.01)

(58) Field of Classification Search
CPC .... G01F 23/261; G01F 23/263; G01F 23/265; G01F 23/266; G01F 23/268; G01F 23/296; G01F 23/2961; G01F 23/2962; G01F 23/2963; G01F 23/2965; G01F 23/2966; G01F 23/2967; G01F 23/2968; G01F 25/20; G01F 25/22; F25D 21/14
See application file for complete search history.

(56) References Cited

U.S. PATENT DOCUMENTS

| | | | |
|---|---|---|---|
| 6,832,516 | B1 | 12/2004 | Dam et al. |
| 7,010,928 | B2 | 3/2006 | Spanger |
| 7,610,805 | B2 | 11/2009 | Crider |
| 7,743,801 | B2 | 6/2010 | Janardhanam et al. |
| 8,844,353 | B2 | 9/2014 | Hsiao |
| 8,924,167 | B2 | 12/2014 | Decker |
| 9,789,697 | B1 | 10/2017 | Knierim et al. |
| 2005/0138939 | A1* | 6/2005 | Spanger ............... F24F 13/222 62/128 |
| 2008/0020493 | A1* | 1/2008 | Jin ........................ G01F 23/296 438/5 |
| 2008/0156395 | A1* | 7/2008 | Janardhanam ........ F25D 23/126 141/351 |
| 2014/0184247 | A1* | 7/2014 | Tran ...................... G01S 15/931 324/663 |
| 2015/0022334 | A1 | 1/2015 | Guillory et al. |
| 2017/0156540 | A1 | 6/2017 | Wheatley et al. |
| 2017/0305392 | A1 | 10/2017 | Lee |
| 2021/0188663 | A1* | 6/2021 | Kamen ................... F01K 17/04 |

FOREIGN PATENT DOCUMENTS

| | | |
|---|---|---|
| CN | 205849315 U | 1/2017 |
| DE | 202015101687 U1 | 7/2016 |
| KR | 1020050058037 A | 6/2005 |
| WO | WO-2018217818 A1 * | 11/2018 ............. A61B 5/202 |

OTHER PUBLICATIONS

International Search Report of the International Searching Authority; International Application No. PCT/US2019/062181; International Filing Date: Nov. 19, 2019; dated Feb. 27, 2020; 5 pages.

Written Opinion of the International Searching Authority; International Application No. PCT/US2019/062181; International Filing Date: Nov. 19, 2019; dated Feb. 27, 2020; 8 pages.

Reliance Detection Technologies, LLC, "HVAC/Air Conditioner Condensate Pan Overflow Detection Alarm," Date: 2018; 4 pages, https://reliancedetection.com/products/water-alarms-leak-detection/hvac-overflow-protection/.

Senix Corporation, "Liquid Level Sensor Applications," 5 pages, https://senix.com/liquid-level/.

\* cited by examiner

SENSING OF A WATER LEVEL IN REFRIGERATED CABINETS

CROSS REFERENCE TO RELATED APPLICATIONS

This application is a National Stage application of PCT/US2019/062181 filed Nov. 19, 2019, which claims priority to IN application 201811043594 filed Nov. 20, 2018, both of which are incorporated by reference in their entirety herein.

BACKGROUND

Embodiments of the present disclosure relate to a refrigerated mechandiser, and more particularly, to a method of detecting a condensate water level in a refrigerated mechandiser.

Refrigerated sales cabinets for presenting cooled and/or frozen goods to potential customers including standalone cabinets, which include a complete refrigeration circuit and need only to be connected to an electric power supply in order to operate the refrigeration circuit, are known in the art. The operation of the refrigeration circuit within such cabinets usually produces condensed water, in particular at the evaporator. This condensed water needs to be disposed from the goods presentation and air circulation space in order to maintain an attractive goods presentation and in order to maintain the cooling capacity of the refrigeration circuit.

It is known in the art to collect the condensed water in a condensed water collecting container, which is arranged below the evaporator. In existing refrigerated sales cabinets, the condensed water may accumulate over time and may overflow from the collecting container. As a result, the water can spill onto the floor in front of the refrigerated sales cabinet, creating a slipping hazards. Existing systems do not typically include an alarm system that is capable of indicating the level of water within the container or that maintenance is required.

BRIEF DESCRIPTION

According to an embodiment, a system for monitoring a water collecting container includes a first sensor operable to detect if water is present within the water collecting container, a second sensor operable to determine a level of water within the water collecting container, and a processing device operably coupled to the first sensor and the second sensor.

In addition to one or more of the features described above, or as an alternative, in further embodiments at least one of the first sensor and the second sensor is a conductive sensor.

In addition to one or more of the features described above, or as an alternative, in further embodiments both the first sensor and the second sensor are conductive sensors.

In addition to one or more of the features described above, or as an alternative, in further embodiments at least one of the first sensor and the second sensor is mounted to a base of the water collecting container.

In addition to one or more of the features described above, or as an alternative, in further embodiments at least one of the first sensor and the second sensor is mounted within the water collecting container at a position offset from a base of the water collecting container.

In addition to one or more of the features described above, or as an alternative, in further embodiments at least one of the first sensor and the second sensor is an ultrasonic sensor.

In addition to one or more of the features described above, or as an alternative, in further embodiments at least one of the first sensor and the second sensor is mounted adjacent an upper end of the water collecting container.

In addition to one or more of the features described above, or as an alternative, in further embodiments the first sensor and the second sensor are simultaneously operable.

In addition to one or more of the features described above, or as an alternative, in further embodiments operation of the second sensor is initiated in response to detecting water within the water collecting container by the first sensor.

In addition to one or more of the features described above, or as an alternative, in further embodiments the processing device is operable to generate an alert when the level of water within the water collecting container reaches a predetermined threshold.

In addition to one or more of the features described above, or as an alternative, in further embodiments the water collecting container includes a non-conductive tray.

In addition to one or more of the features described above, or as an alternative, in further embodiments the water collecting container is mounted within a cabinet of a refrigerated sales cabinet.

According to another embodiment, a method of monitoring a water collecting container includes detecting if water is present within the water collecting container via a first sensor, determining a level of water present within the water collecting container with a second sensor, and generating an alert via an indicator if the level of water present within the water collecting container exceeds a predetermined threshold.

In addition to one or more of the features described above, or as an alternative, in further embodiments detecting if water is present within the water collecting container and determining the level of water present within the water collecting container occur simultaneously.

In addition to one or more of the features described above, or as an alternative, in further embodiments determining the level of water present within the water collecting container with the second sensor occurs in response to detecting that water is present within the water collecting container via the first sensor.

In addition to one or more of the features described above, or as an alternative, in further embodiments detecting if water is present within the water collecting container includes evaluating an electrical conductivity at the first sensor.

In addition to one or more of the features described above, or as an alternative, in further embodiments determining a level of water present within the water collecting container with a second sensor includes evaluating an electrical conductivity at the second sensor.

In addition to one or more of the features described above, or as an alternative, in further embodiments determining a level of water present within the water collecting container with a second sensor includes emitting a sound wave into an interior of the water collecting container.

In addition to one or more of the features described above, or as an alternative, in further embodiments the predetermined threshold indicates that the water collecting container is almost full.

In addition to one or more of the features described above, or as an alternative, in further embodiments the predetermined threshold indicates that the water collecting container is full.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
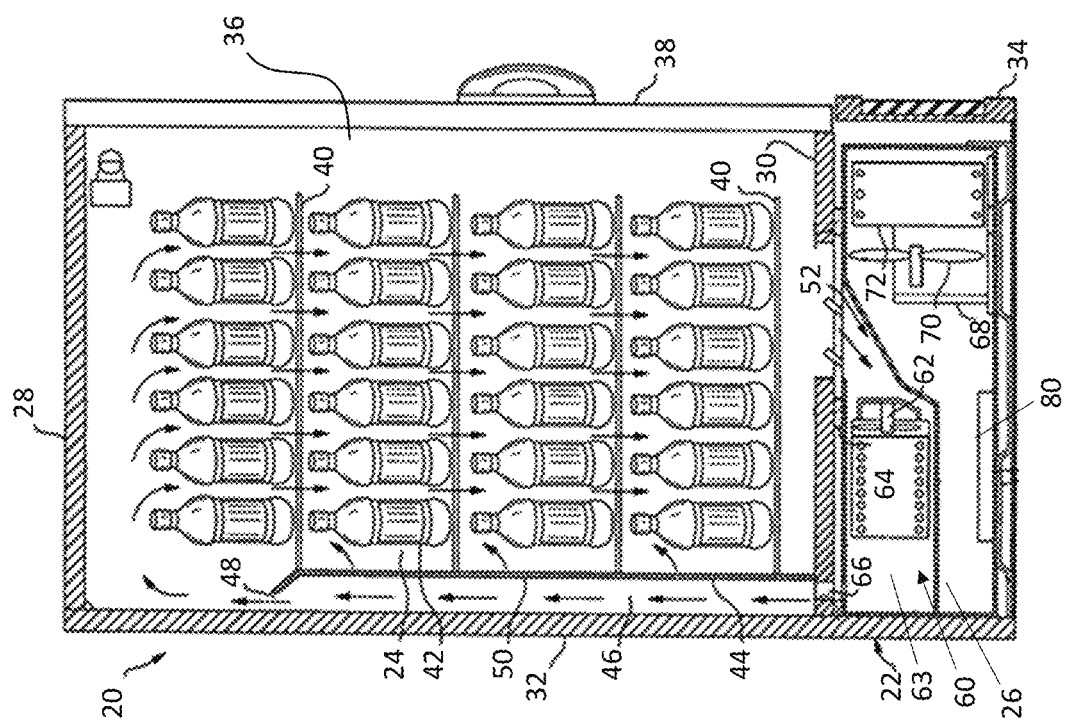
FIG. 1 is a schematic cross-section of an example of a refrigerated sales cabinet.

Referring now to FIG. 1, an example of a refrigerated sales cabinet 20 is illustrated. The refrigerated sales cabinet 20 includes a cabinet 22 having a refrigerated interior product display space 24 and an equipment compartment 26 disposed separate from the refrigerated interior product display space 24. As shown, the cabinet 22 includes a top wall 28 and a bottom wall 30 disposed between the refrigerated interior product display space 24 and the equipment compartment 26 located there beneath. The cabinet 22 additionally includes a surrounding side wall structure including a rear wall 32, a front wall 34, and opposed generally vertical extending side walls (not shown).

The interior product display space 24 may be accessed from an exterior of the cabinet 22 through an access opening 36, which in the illustrated, non-limiting embodiment, is an open area formed at the front of the cabinet 22. This open area may be open to the environment, or alternatively, may be covered by at least one door 38 mounted to the cabinet 22, as shown in the FIG. The door 38 extends across the open area and may include a transparent viewing area, such as a glass panel for example, through which at least a portion of the interior product display space 24 can be viewed. The door 38 is selectively movable between a closed position covering the open area (as shown) and an open position in which a consumer can access the interior product display space 24 to remove a product therefrom. The door 38 may be mounted to the cabinet 22 in a conventional manner, such as via hinges for pivotal movement, or on a track for sliding movement. Although the refrigerated sales cabinet 20 is illustrated with a single door 38 mounted adjacent the open area, it should be understood that in other embodiments, the refrigerated sales cabinet 20 may include any number of doors, such as two, three, or four doors for example, that collectively cover the open area when in the closed position.

In an embodiment, the plurality of walls 28, 30, 32, 34 of the cabinet 22 are heat transfer insulated for insulating the refrigerated interior product display space 24 from the environment exterior to the interior product display space 24. A plurality of shelves 40 are mounted within the interior product display space 24 to support various products 42 being displayed for purchase. The specific number, arrangement, and configuration of the shelves 40 will vary based on the products positioned within the interior product display space 24. Examples of products that may be stored within the interior product display space 24 include bottled or canned soda, milk, water, juices, fruit drinks, beer, and other beverages. However, it should be understood that the refrigerated sales cabinet 20 may be used to displaying any type of perishable and/or frozen comestibles and beverages, including for example meats, poultry, fish, dairy products, prepackaged frozen foods, and other products that need to be maintained in a controlled environment.

As shown, a rear panel 44 is spaced inwardly of the rear wall 32 to establish a refrigerated air supply duct 46 between the rear wall 32 and the rear panel 44. The interior product display space 24 within the interior of the cabinet 22 is bounded by the top wall 28, the lower wall 30, the side walls, and in part by the rear wall 32 and the rear panel 44. Refrigerated air enters the interior product display space 24 to cool the product displayed therein through an air outlet 48 arranged at the upper end of the air supply duct 46. In an embodiment, refrigerated air is also configured to enter the interior product display space 24 through a plurality of openings 50 formed in the rear panel 44. Air exits the interior product display space 24 through an opening 52 formed in the lower wall 30.

As shown the equipment compartment 26 is located within the cabinet 22, beneath the lower wall 30 such that the equipment compartment 26 is separated from the interior product display space 24. However, embodiments where the equipment compartment 26 is arranged at another position within the cabinet 22 are also contemplated herein. A refrigeration system 60 for providing cool air to the interior product display space is arranged within the equipment compartment 26. In the illustrated, non-limiting embodiment, the equipment compartment 26 is divided into an upper portion and a lower portion.

The refrigeration system 60 includes an air movement mechanism 62, such as a fan for example, for directing the air provided to the equipment compartment 26 from the interior product display space 24 through an air circulating space 63 formed in the upper portion of the equipment compartment. The upper portion includes an evaporator, and the air moved by the air movement mechanism is configured to pass over the evaporate 64 before being delivered to the air supply duct 46 through an opening 66. A compressor 68 and another air movement mechanism 70 are arranged in the lower portion of the equipment compartment 26. The air movement mechanism 70 generates a second airstream which is directed over a condenser 72 and may be exhausted exterior to the refrigerated sales cabinet 20. The compressor 68, condenser 72, evaporator 64 and an expansion device (not shown) are connected to form a refrigeration circuit as is known in the art.

When the refrigeration system 60 is operating, the evaporator 64 cools the stream of air which is guided through the air circulation space 63 by the air movement mechanism 62 into the air supply duct 46 and the interior product display space 24 to cool the goods 42 provided on the shelves 40. During operation, humidity within the air stream flowing through the air circulation space 63 will condense therein, particularly at the evaporator 64.

In order to collect the condensed water dropping from the evaporator 64, a water collecting container 80 is arranged in the lower portion of the equipment compartment 26, such as directly underneath the evaporator 64 for example. The water collecting container 80 may be formed from any suitable material, such as plastic or metal. In an embodiment, the water collecting container 80 may be heated, such as by waste heat generated by operation of the compressor 68 for example or by a dedicated heater, to evaporate the water collected in the water collecting container 80 to the second air stream passing through the lower portion of the equipment compartment 26.

Figure 2:
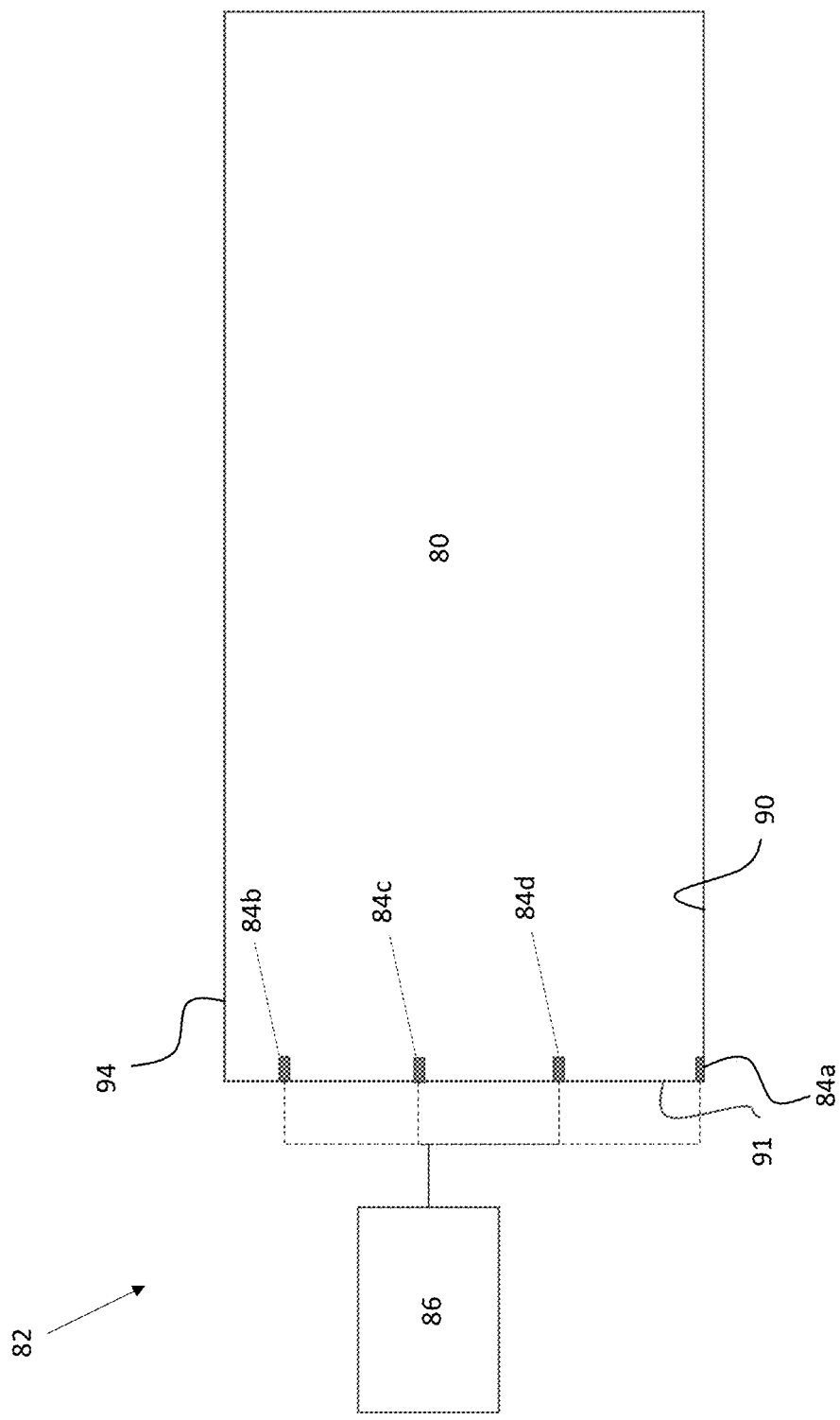
FIG. 2 is a schematic diagram of a monitoring system for a water collecting container of a refrigerated sales cabinet according to an embodiment.
Figure 3:
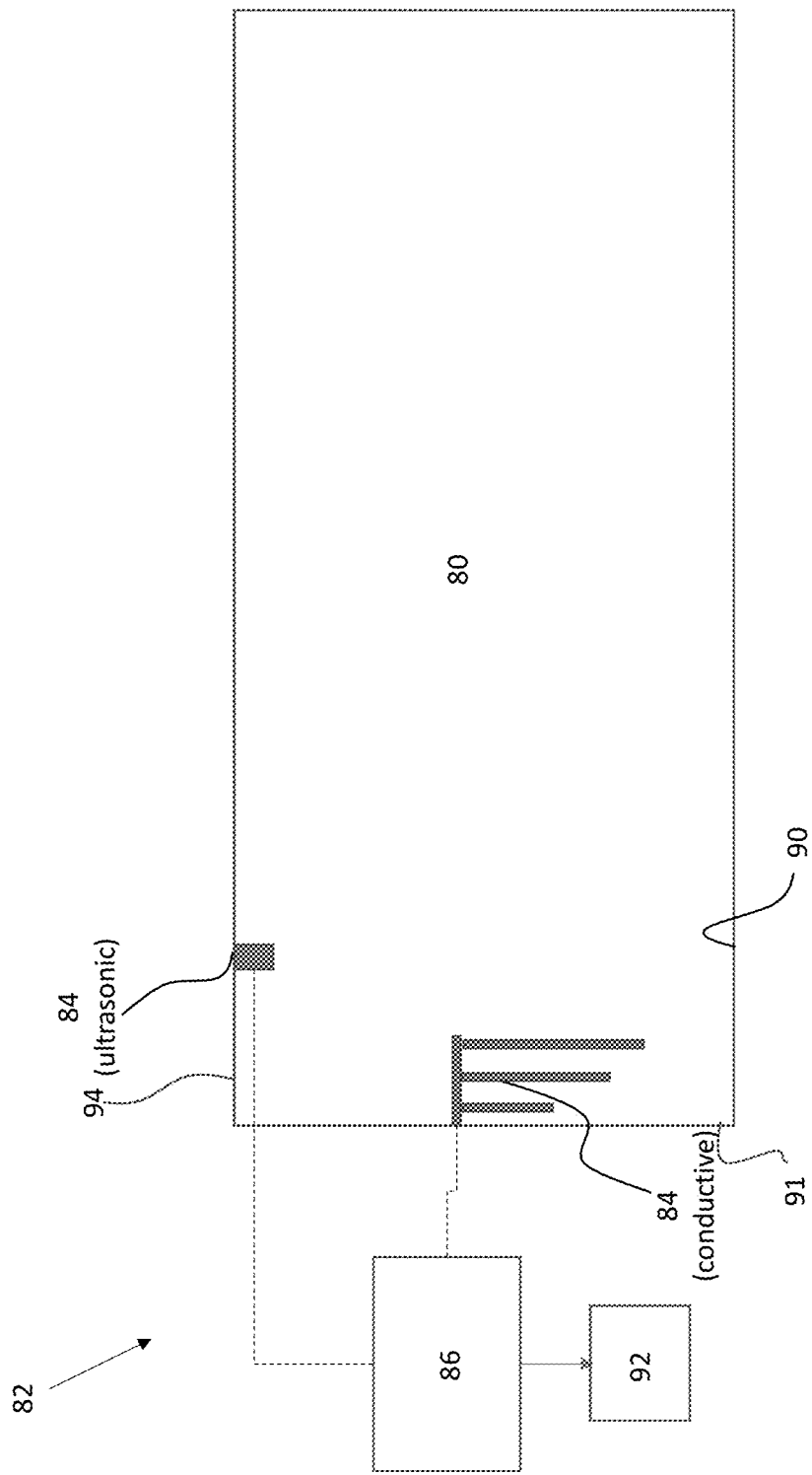
FIG. 3 is a schematic diagram of a monitoring system for a water collecting container of a refrigerated sales cabinet according to an embodiment.

With reference now to FIGS. 2-3, in an embodiment, the refrigerated sales cabinet 20 includes a system 82 for monitoring the water collecting container 80. As shown, the system 82 includes at least one sensor 84 for monitoring the water collecting container 80, the at least one sensor 84 being operably coupled to a processing device 86. Depending on the configuration of the cabinet 22, the at least one sensor 84 may be self-powered, or may be connected to a power source (not shown). Further, the processing device 86 may be dedicated specifically for use with the at least one sensor 84, or alternatively, may be a part of a controller associated with operation of the refrigeration system 60 within the cabinet 22.

In an embodiment, the at least one sensor 84 is operable to detect the presence of water within the water collecting container 80. For example, the sensor 84 may be a conductive sensor, such as mounted to an interior surface of a base 90 or sidewall 91 of a plastic water collecting container 80 for example. However, it should be understood that the at least one sensor 84 may be mounted at any suitable location relative to the water collecting container 80. During operation, the conductive sensor 84 generates a signal indicating an amount of electricity conducted by the conductive sensor 84. When water is present within the water collecting container 80, the amount of electricity conducted by the conductive sensor changes, for example increases. Accordingly, the processing device 86 will evaluate the conducted electricity signals output from the conductive sensor 84 to determine if water is present within the water collecting container 80 at the sensor 84.

In an embodiment, the at least one sensor 84 includes a plurality of sensors. As best shown in FIG. 2, the plurality of sensors may include a first sensor 84*a* and a second sensor 84*b* In an embodiment, both the first sensor 84*a* and the second sensor 84*b* are conductive sensors. The second sensor 84*b* may be mounted within the hollow interior of the water collecting container 80 at a position offset from the base 90. In an embodiment, the second sensor 84*b* is arranged at a location associated with a first warning level. Accordingly, once the water within the water collecting container 80 reaches the level of the second sensor 84*b*, the second sensor 84*b* will sense the water, and the processing device 86 may provide a warning via an audio and/or visual indicator, illustrated schematically at 92, to indicate that the water level within the water collecting container 80 has reached a predetermined threshold. Although the water collecting container 80 of FIG. 2 is illustrated and described as having a first conductive sensor 84*a* and a second conductive sensor 84*b*, embodiments having any number of additional conductive sensors, such as sensors 84*c* and 84*d* of FIG. 2, for sensing various levels of water within the water collecting container 80 are also contemplated herein. Further, a warning may be generated when water is detected by teach of the plurality of conductive sensors.

Alternatively, or in addition, the at least one sensor 84 may be operable to determine a level of water within the water collecting container 80. In such embodiments, the sensor 84 may be an ultrasonic sensor, for example mounted to an upper end 94 of the water collecting container 80 or to another surface within the equipment compartment 26 offset from the water collecting container 80, as shown in FIG. 3. The ultrasonic sensor 84 emits a sound wave and determines the length of time required for the emitted sound wave to reflect back to the ultrasonic sensor 84. Accordingly, the signals output from the ultrasonic sensor 84 are used to estimate the distance between the ultrasonic sensor 84 and the surface of the water contained within the water collecting container 80, thereby identifying the level of the water within the water collecting container 80. The ultrasonic sensor 84 may sample the level of the water within the water collecting container 80 at intervals or continuously. As a result, the ultrasonic sensor 84 is operable to detect if the water level within the water collecting container 80 is rising and/or approaching a level or threshold where the refrigerated sales cabinet 20 requires maintenance.

Figure 6:
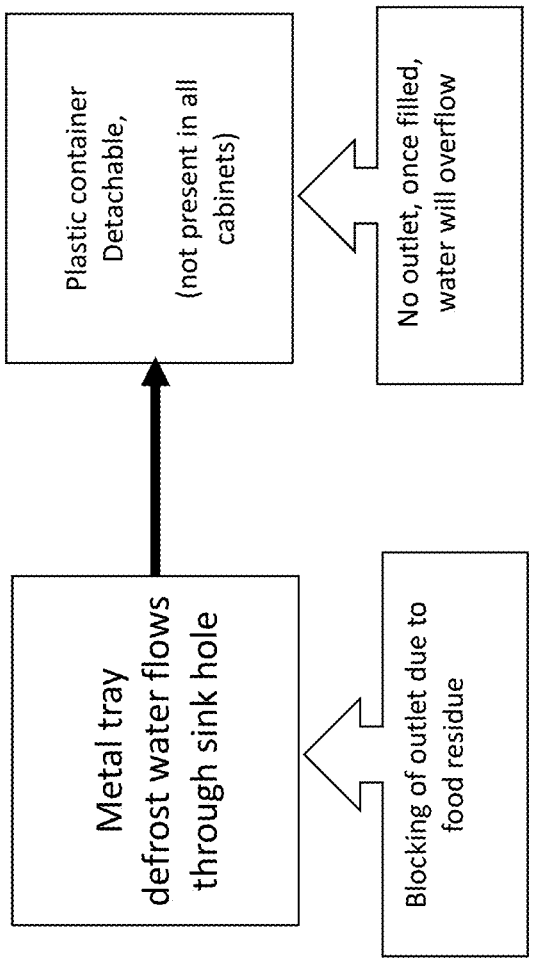
FIG. 6 is a schematic diagram of a cabinet having a multi-level water storage configuration according to an embodiment.

In embodiments where the at least one sensor 84 includes a plurality of sensors, the plurality of sensors may be operable simultaneously to provide redundancy to the system 82. For example, in embodiments where the cabinet 22 includes multiple levels of water storage, one or more sensors 84 may be arranged at each level within the cabinet 22. As illustrated schematically in FIG. 6, a first level of the cabinet 22 may include a metal tray having a sink hole, and a second lower level of the cabinet may include a water collecting container 80 configured to receive condensate via the sink hole. At least one sensor 84 mounted to the metal tray may be operable to sense if the outlet formed therein is blocked, such as due to the accumulation of food reside for example, and at least one sensor 84 mounted to the water collecting container 80 may be used to determine a level of water within the water collecting container 80.

In another embodiment, operation of the plurality of sensors 84 may occur sequentially. For example, in an embodiment, operation of the ultrasonic sensor 84 may only be initiated in response to detecting the presence of water within the water collecting container 80 by a sensor mounted at a level within the water collecting container 80. In embodiments including a conductive sensor 84 and an ultrasonic sensor 84, operation of the ultrasonic sensor 84 may be initiated in response to detection of water within the container by the first conductive sensor 84. In such embodiments, the processing device 86 may initiate operation of the ultrasonic sensor 84, or alternatively, the first sensor 84 may communicate directly with the ultrasonic sensor 84 to commence operation thereof. Accordingly, in such embodiments, until water is determined to be present within the water collecting container 80, at least one sensor of the plurality of sensors may remain inactive.

Figure 4:
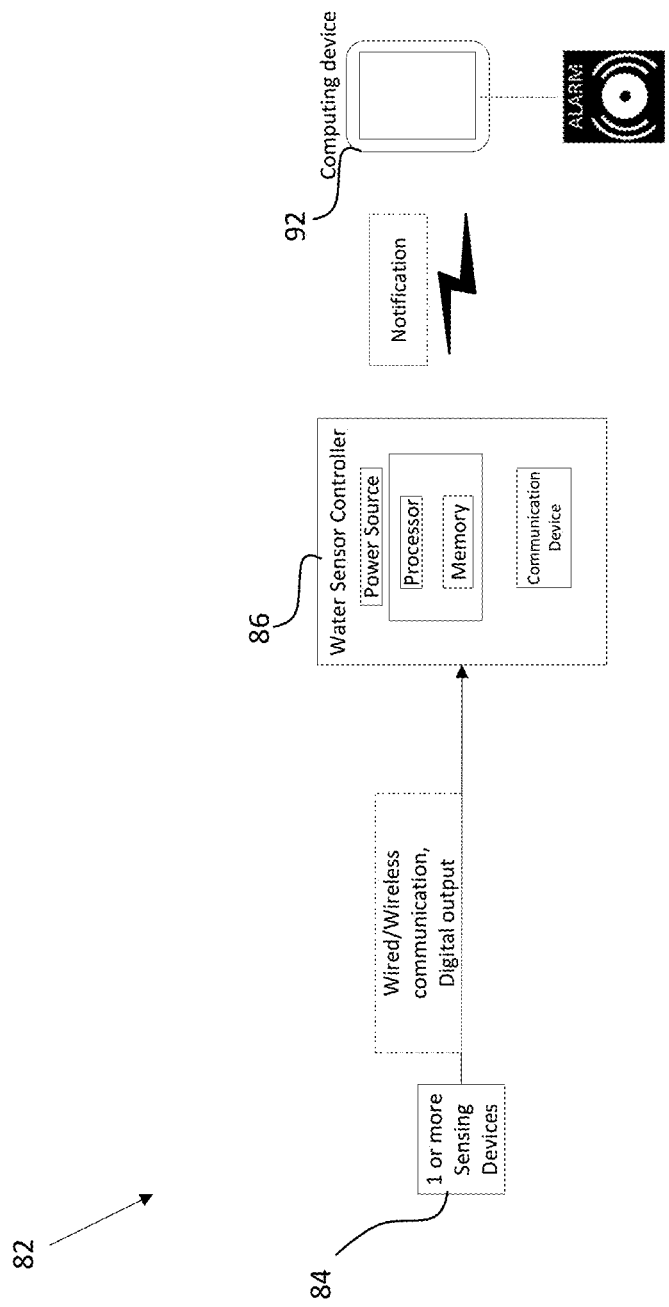
FIG. 4 is a schematic diagram of a monitoring system for a water collecting container of a refrigerated sales cabinet according to an embodiment.
Figure 5:
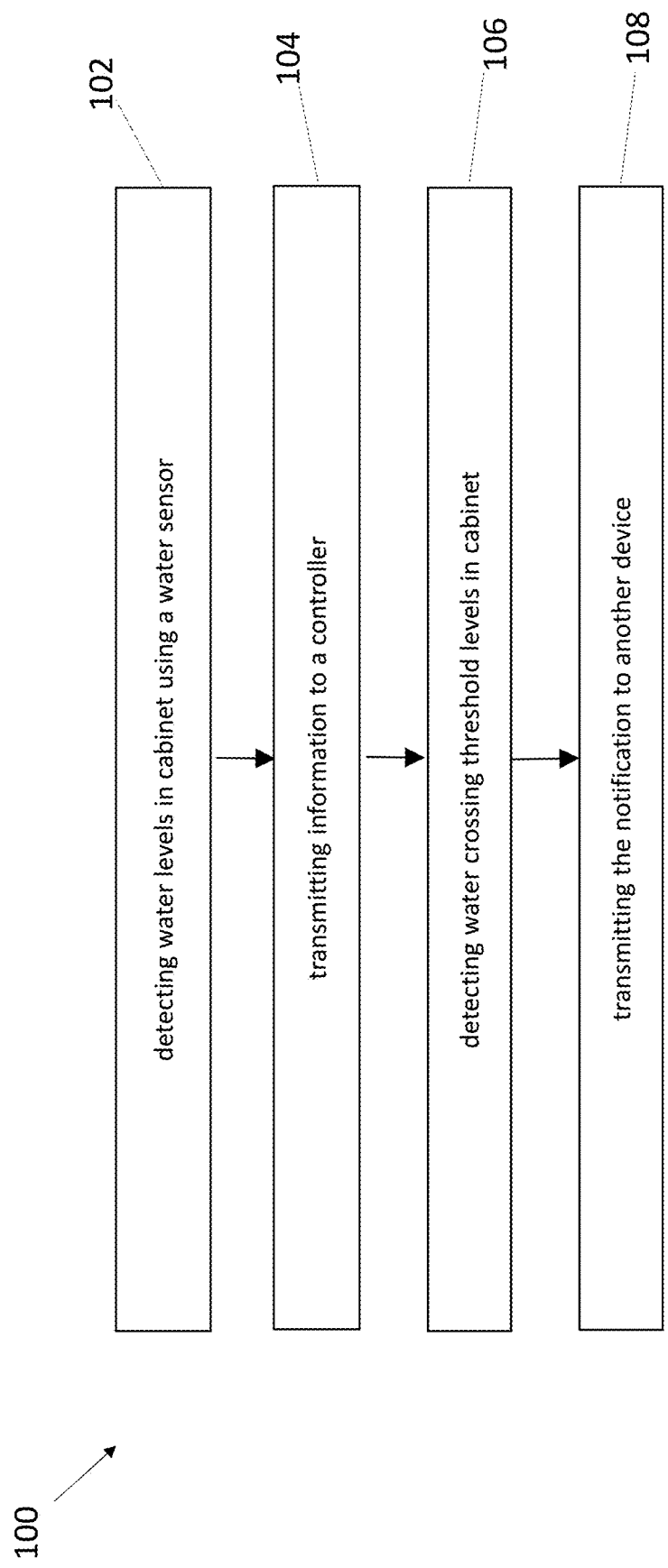
FIG. 5 is a method of operating the monitoring system according to an embodiment.

The system 82, and more specifically the processing device 86 may use the information provided by the at least one sensor to perform one or more calculations as well as generate one or more alerts at a computing device 92 (see FIG. 4). As used herein, the term alert includes, but is not limited to, an alarm, a notification including a text message, email, or application alert, a sound or any other way to tell a service operation or third part about the system 82. With reference to FIG. 5, a method of operation of the system 82 is illustrated in more detail. As shown, the method 100 includes collecting information from the at least one sensor 84 to detect the water level within the water collecting container 80 in step 102. In step 104, the information gathered by the sensor(s) is communicated to the controller. In step 106, the controller will determine using the sensor data, whether the water level within the water collecting container 80 has crossed a threshold. If the water level within the water collecting container 80 has exceeded a threshold, the controller may be operable to transmit an alert or notification via wireless or wired communication to a computing device as previously described. Alternatively, or in addition, the controller may adjust one or more operating parameters of the refrigeration system 60 in response to the sensed water level within the water collecting container 80.

In an embodiment, the processing device 86 uses the information provided by an ultrasonic sensor 84, as well as stored information regarding the configuration of the refrigeration sales cabinet 20 and the water collecting container 80, to estimate a time length of time until the water within the water collecting container 80 reaches a predetermined level. In another embodiment, the processing device 86 may provide an alert that the water within the water collecting container 80 has reached a predetermined threshold. In such embodiments, the predetermined threshold may be below the upper end of the water collecting container 80 such that the threshold is reached before the water collecting container overflows. The processing device 86 may additionally generate an alert at a computing device 92 that the water within the water collecting container 80 is full, or that overflow has occurred.

By sensing not only the presence of water, but also the level of water within a water collecting container 80, the system 82 for monitoring the water collecting container 80 has an improved reliability with increased accuracy of water sensing. In addition, the system 82 illustrated and described herein provides a low cost solution that may be installed without making any mechanical changes to the cabinet 22, equipment compartment 26 and water collecting container 80. Accordingly, the system 82 herein may be used in both new and retrofit applications.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for monitoring a water collecting container of a refrigerated sales cabinet, the system comprising:
    a first sensor operable to detect if water is present within the water collecting container, the first sensor being mounted to a surface of the water collecting container within an interior of the water collecting container;
    a second sensor operable to determine a level of water within the water collecting container, the second sensor being located vertically above an upper end of the water collecting container, wherein the first sensor is a first type of sensor and the second sensor is a second type of sensor different from the first type of sensor; and
    a processing device operably coupled to the first sensor and the second sensor, the processing device being configured to initiate operation of the second sensor in response to detecting water within the water collecting container by the first sensor;
    wherein the water collecting container is mounted within the refrigerated sales cabinet.

2. The system of claim 1, wherein at least one of the first sensor and the second sensor is a conductive sensor.

3. The system of claim 2, wherein the first sensor is mounted to a base of the water collecting container.

4. The system of claim 2, wherein the first sensor and is mounted within the water collecting container at a position offset from a base of the water collecting container.

5. The system of claim 1, wherein at least one of the first sensor and the second sensor is an ultrasonic sensor.

6. The system of claim 1, wherein the processing device is operable to generate an alert when the level of water within the water collecting container reaches a predetermined threshold.

7. The system of claim 1, wherein the water collecting container includes a non-conductive tray.

8. The system of claim 1, wherein the water collecting container is mounted within a cabinet of a refrigerated sales cabinet.

9. A method of monitoring a water collecting container of a refrigerated sales cabinet, the method comprising:
    detecting if water is present within the water collecting container via a first sensor, the first sensor being mounted to a surface of the water collecting container within an interior of the water collecting container and the water collecting container being position within the refrigerated sales cabinet;
    initiating operation of a second sensor in response to detection of water within the water collecting container via the first sensor;
    determining a level of water present within the water collecting container with the second sensor, the second sensor being located vertically above an upper end of the water collecting container, the first sensor being a first type of sensor and the second sensor being a second type of sensor different from the first type of sensor; and
    generating an alert via an indicator if the level of water present within the water collecting container exceeds a predetermined threshold.

10. The method of claim 9, wherein detecting if water is present within the water collecting container includes evaluating an electrical conductivity at the first sensor.

11. The method of claim 9, wherein determining a level of water present within the water collecting container with a second sensor includes evaluating an electrical conductivity at the second sensor.

12. The method of claim 9, wherein determining a level of water present within the water collecting container with a second sensor includes emitting a sound wave into an interior of the water collecting container.

13. The method of claim 9, wherein the predetermined threshold indicates that the water collecting container is almost full.

14. The method of claim 9, wherein the predetermined threshold indicates that the water collecting container is full.

\* \* \* \* \*